J. WRIGHT.
APPARATUS FOR TRANSFERRING INLAID LINOLEUM TO A BACKING.
APPLICATION FILED APR. 10, 1908.
906,178.
Patented Dec. 8, 1908.
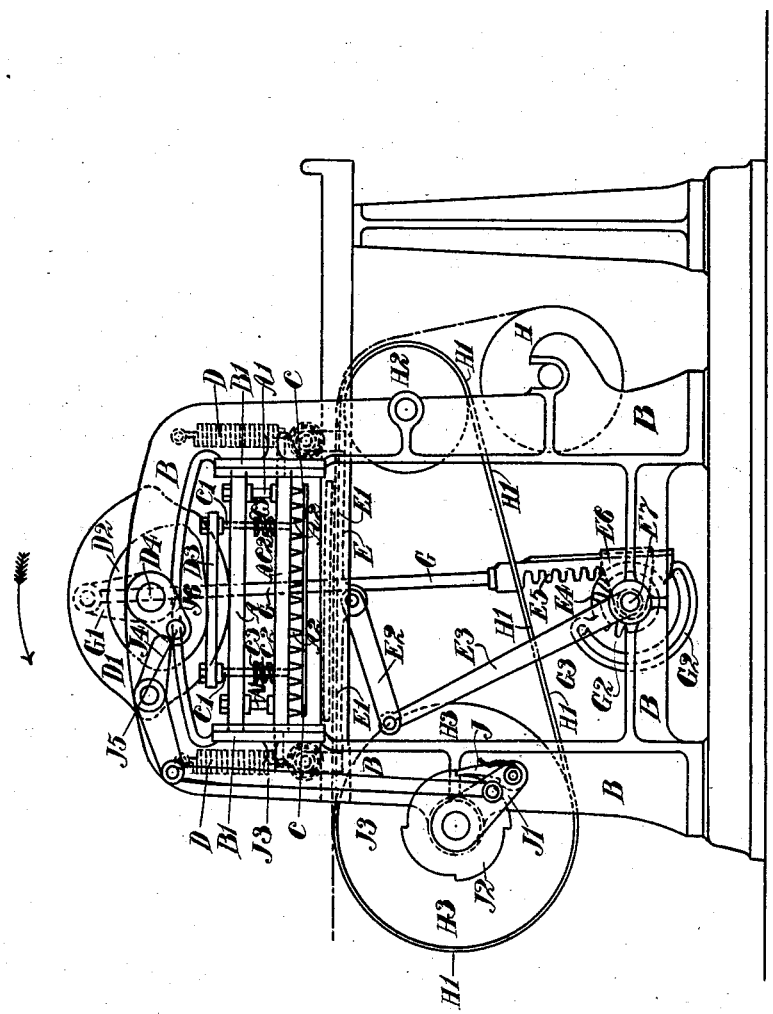
WITNESSES.
INVENTOR
JOHN WRIGHT
By
HIS ATTORNEY

UNITED STATES PATENT OFFICE.

JOHN WRIGHT, OF POLLOKSHIELDS, SCOTLAND.

APPARATUS FOR TRANSFERRING INLAID LINOLEUM TO A BACKING.

No. 906,178.　　　　Specification of Letters Patent.　　　Patented Dec. 8, 1908.

Application filed April 10, 1908. Serial No. 426,279.

*To all whom it may concern:*

Be it known that I, JOHN WRIGHT, a subject of the King of England, and resident of Pollokshields, Scotland, have invented an Apparatus for Transferring Inlaid Linoleum to a Backing, of which the following is a specification.

This invention relates to the so-called "inlaid" linoleum in which pattern is formed throughout the substance of the material, and has for its object to provide a simple and effective apparatus by means of which, once the patterned tiles are formed in the usual manner, they are transferred to the usual backing material. This device for the transference of the patterned tile to the backing consists essentially of a platen carrying pins and a stripping plate. The tiles are removed from the apparatus where they are formed and placed beneath the platen which is then moved down so that the pins upon its surface enter the material of the tile. It is then raised, carrying with it the tile, and moved to position over the backing material upon which the platen, and its tile are lowered. The platen is then raised and the stripping plate held in position, upon which the tile is discharged upon the backing.

A machine embodying such a device and providing means for operating mechanically is shown in side elevation upon a sheet of explanatory drawings hereunto appended.

In this machine, the platen referred to consists of a pair of sufficiently massive plates, A, A held apart by distance pieces, $A^1$, and the lower carrying pins, $A^2$, while the whole is guided in vertical slides, $B^1$, in the machine framing B. The stripping plate, C, having in it apertures through which the pins, $A^2$, project, when that plate is raised towards the lower plate, A, is carried upon guide rods, $C^1$, on which springs, $C^2$, acting between the lower plate, A, and collars, $C^3$, on the rods, tends always to throw the plate upwards, causing the pins, $A^2$, to protrude. The whole plates, A, A, plate C, and their connections,—are suspended upon springs, D, suspended from the framing, B, and the plates are moved up and down and conjointly operated as hereinafter explained, by cams, $D^1$, $D^2$, the one set, $D^1$, operating upon the upper plate, A, the other set, $D^2$, upon tread plates, $D^3$, carried upon the guide rods, $C^1$, and thus connected to the plate, C. The cams, $D^1$, $D^2$, are carried upon a main shaft, $D^4$, driven in the direction indicated by the arrow.

Beneath the platen is a table-like frame, E, having guides in its sides in which slides a tray, $E^1$, to receive the tiles hereinbefore referred to. This tray, $E^1$, is operated, through links, $E^2$, by levers, $E^3$, one at each side of the machine in such a manner that the tray travels out clear of the platen and beneath it alternatively with a period of rest in each position. The mechanism causing this motion consists of a pinion $E^4$, (on one side of the machine) loose upon the same shaft, $E^7$, as the levers, $E^3$, are fixed upon and rotated in opposite directions alternatively by a rack, $E^5$, sliding in a pivoted guide $E^6$, and carried upon a connecting rod, G, connected at its other end to a crank, $G^1$, on the main shaft, $D^4$. The period of rest is attained by a slotted plate, $G^2$, fixed to the pinion and engaged by a pin, $G^3$, in one of the levers, $E^3$, the levers, $E^3$, of course not commencing to move until the pin upon the one of them has encountered either end (depending upon the direction of rotation) of the slot in the plate, $G^2$.

The backing material which is to receive the linoleum tiles is carried upon a beam, H, and passes out through the machine in the direction indicated by the chain-dotted line. It is driven and is supported beneath the platen by a follower band, $H^1$, stretched over rollers, $H^2$, $H^3$, the band being provided with spikes (not shown) which grip the backing as is usual in linoleum printing machines. The roller, $H^3$, is driven intermittently—at each step a distance equal to the width of the tiles used—by a pawl, J, carried on a lever, $J^1$, upon the axis of the roller, $H^3$, and engaging a ratchet wheel, $J^2$, fixed to the roller. This ratchet mechanism is operated through a connecting rod, $J^3$, by a tappet lever, $J^4$, struck during each revolution of the main shaft, $D^4$, by a pin, $J^5$, on a crank $J^6$, on that shaft, the weight of the parts serving to return them to receive the next impulse from the pin, $J^5$.

In operation and during a period of rest of the tray, $E^1$, in its outward position, a light tray or framing, containing the tiles in the pattern order in which they are to be affixed to the backing, is placed on it. The tray, $E^1$, then returns with its load beneath the platen, and the platen plates, A, and stripping plate, C, conjointly operated by the cams, $D^1$, $D^2$, in such manner that the pins, $A^2$, are caused to protrude, descend and the pins enter the tiles in the tray. The cams then permit the springs, D, to raise the platen carrying with it the tiles adhering to the pins. The tray, $E^1$, moves out again. The platen then descends depositing the tiles upon the backing material. The cams now operate the plates, A, and, C, so that the latter presses upon the surface of the tiles now on the backing, while the plates, A, rise so retracting the pins, $A^2$. The whole platen then rises leaving the tiles upon the backing, the backing is moved a step forward by its followers, $H^1$, operated by the ratchet, $J^2$, and pawl, J, while the tray, $E^1$, is at rest in its outermost position awaiting the next consignment of tiles.

Having fully described my invention, what I claim and desire to secure by Letters Patent is:—

1. An apparatus for transferring tiles of linoleum to a backing, comprising in combination, a platen, said platen consisting of plates (A, A) held apart by distance pieces ($A^1$), pins ($A^2$) on the lower plate, the whole being guided in the machine frame, a stripping plate (C), said stripping plate having holes through which the said pins ($A^2$) project, guide rods ($C^1$) on which said plate (A) is carried, collars ($C^3$) on said guide rods, springs ($C^2$) acting against said collars and tending to throw said plate (C) upwards, springs (D) on the machine frame, on which the above mentioned parts are hung, cams ($D^1$) operating the upper plate (A), plates ($D^3$) carried on rods ($C^1$), cams ($D^2$) operating said plates, a shaft ($D^4$) carrying and driving said cams and conjointly operating said stripping plate and platen, substantially as described and shown.

2. An apparatus for transferring tiles of linoleum to a backing, comprising in combination, a platen, said platen consisting of plates (A, A) held apart by distance pieces ($A^1$) pins ($A^2$) on the lower plate, the whole being guided in the machine frame, a stripping plate (C), said stripping plate having holes through which the said pins ($A^2$) project, guide rods ($C^1$) on which said plate (A) is carried, collars ($C^3$) on said guide rods, springs ($C^2$) acting against said collars, and tending to throw said plate (C) upwards, springs (D) on the machine frame on which the above mentioned parts are hung, cams ($D^1$) operating the upper plate (A), plates ($D^3$) carried on rods ($C^1$), cams ($D^2$) operating said plates, a shaft ($D^4$) carrying and driving said cams and conjointly operating said stripping plate and platen, a frame (E) beneath said platen, a tray ($E^1$) sliding in said frame, links ($E^2$) connecting said tray to levers ($E^3$), a shaft ($E^7$) upon which said levers are fixed, a pinion ($E^4$) loose on said shaft, a rack ($E^5$) rotating said pinion in opposite directions alternatively, a pivoted guide ($E^6$) in which said rack slides, a connecting rod (G) on which said rack is mounted, a crank ($G^1$) mounted on said shaft ($D^4$) to which crank said connecting rod (G) is connected, a slotted plate ($G^2$) fixed to said pinion, a pin ($G^3$) on said lever ($E^3$) engaging in said slot whereby the period of rest is attained, a beam (H) carrying the backing material, a follower band ($H^1$) supporting said backing, rollers ($H^2$ and $H^3$) over which said follower band is stretched, a pawl (J), a lever ($J^1$) carrying said pawl, said lever being fixed on the axis of said roller ($H^3$), a ratchet wheel ($J^2$) fixed to said roller, a connecting rod ($J^3$), a tappet lever ($J^4$) connected to said connecting rod, a crank ($J^6$) on said shaft ($D^4$), a pin ($J^5$) on said crank ($J^6$), said pin striking said lever ($J^4$) and operating said ratchet mechanism at each revolution of the shaft, whereby the backing material is moved step by step beneath the platen, substantially as described and shown, and for the purpose set forth.

In testimony whereof I have hereunto set my hand in the presence of two subscribing witnesses.

JOHN WRIGHT.

Witnesses:
 JAMES CRAWFORD,
 I. T. WILSON.